INVENTORS.
JOHN T. ROSZA
ORLANDO W. UGUCCINI
LAWRENCE E. ZEEB
By Meyer, Baldwin, Doran & Young
ATTORNEYS May 7, 1963
J. T. ROZSA ETAL
3,088,364
METHOD AND APPARATUS FOR ANALYSIS OF
PARTICLES IN A GASEOUS STREAM
Filed Feb. 25, 1960
4 Sheets-Sheet 2
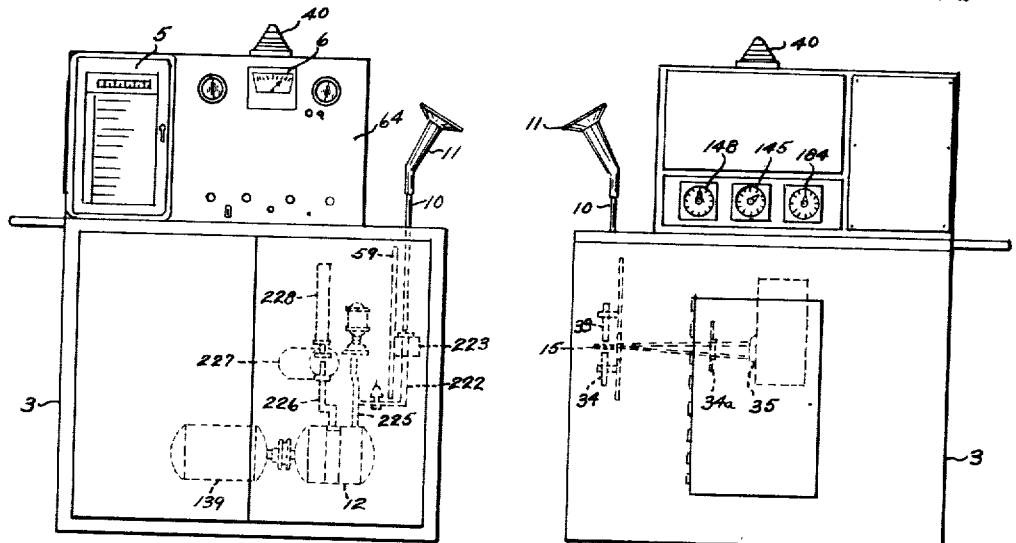
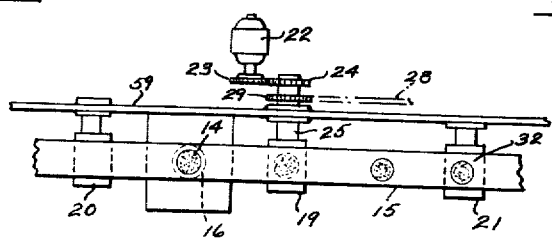
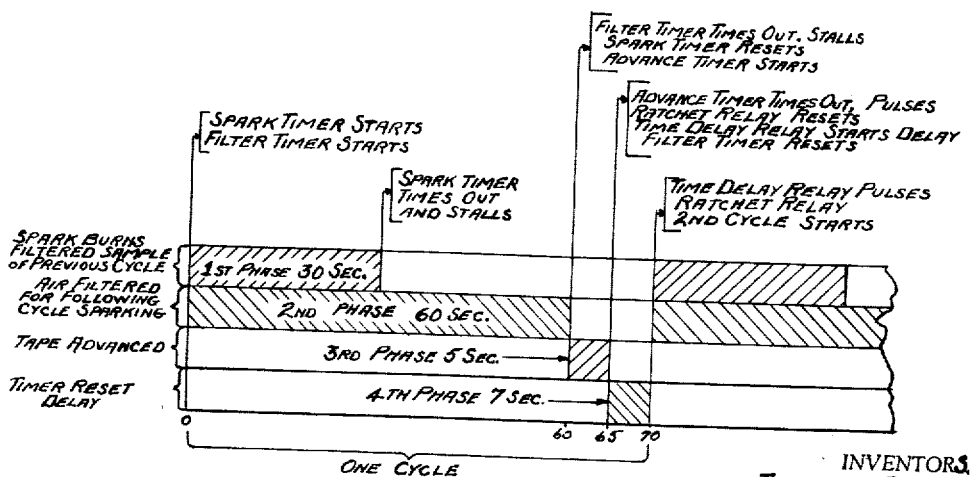
INVENTORS
JOHN T. ROZSA
ORLANDO W. UGUCCINI
LAWRENCE E. ZEEB
BY Meyer, Baldwin, Doan & Young
ATTORNEYS May 7, 1963

J. T. ROZSA ETAL 3,088,364

METHOD AND APPARATUS FOR ANALYSIS OF
PARTICLES IN A GASEOUS STREAM

Filed Feb. 25, 1960

INVENTORS.
JOHN T. ROSZA
ORLANDO W. UGUCCINI
LAWRENCE E. ZEEB

BY Meyer, Baldwin, Doran & Young
ATTORNEYS

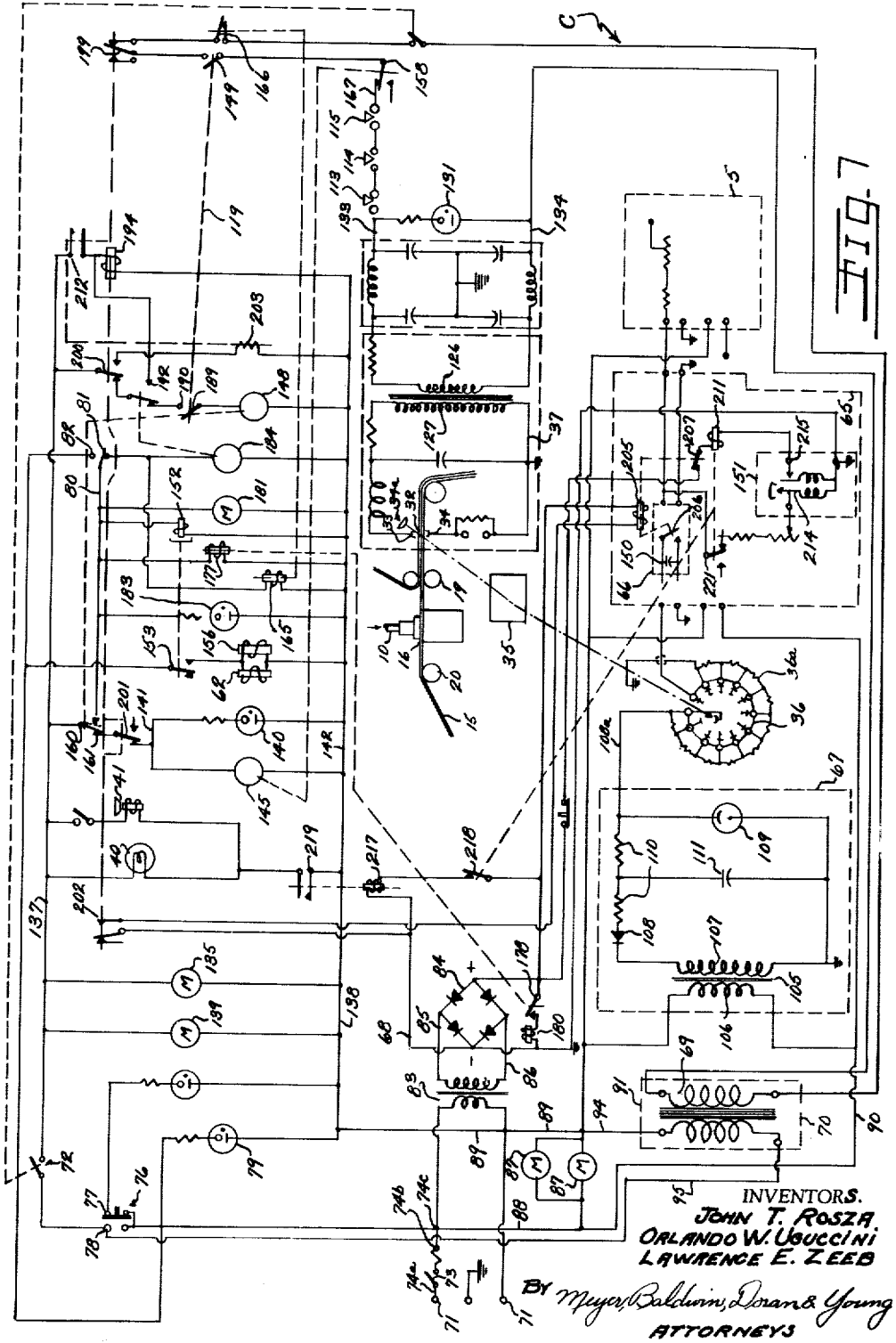

United States Patent Office 3,088,364
Patented May 7, 1963

3,088,364
METHOD AND APPARATUS FOR ANALYSIS OF PARTICLES IN A GASEOUS STREAM
John T. Rozsa, Cleveland, Orlando W. Uguccini, Maple Heights, and Lawrence E. Zeeb, Parma, Ohio, assignors to National Spectrographic Laboratories, Inc., Cleveland, Ohio, a corporation of Ohio
Filed Feb. 25, 1960, Ser. No. 10,924
28 Claims. (Cl. 88—14)

The present invention is directed to an apparatus and method for analysis of the amount of fine particle in a fluid gaseous medium whereby dangerous amounts of relatively fine particles of a toxic material such as beryllium oxide in airborne dust can be quantitatively and continuously sampled and measured.

Many compounds and elements such as lead, arsenic, beryllium and compounds thereof such as beryllium oxide are highly toxic. In the case of beryllium oxide, it is generally considered that the in-plant atmosphere concentration of beryllium oxide should not exceed two micrograms per cubic meter as an average concentration throughout an eight hour day. It is also considered that no one should be exposed to a concentration greater than about 25 micrograms per cubic meter for any period of time, even though the period be short.

Therefore, for the safe handling of toxic materials such as beryllium and its compounds, it is highly desirable to be able to quickly, efficiently, and continuously determine the amount of relatively fine particles of toxic material in the form of dust particles borne in air or other fluid medium.

It is an object of the present invention to provide an apparatus suitable for efficiently and accurately sampling a gaseous fluid such as air for the presence of toxic particles such as beryllium oxide and to continuously obtain an accurate indication of the amount of said toxic particles in the gaseous fluid.

It is an object to provide a method of continuously and accurately sampling a gaseous fluid such as air for the presence of toxic particles such as beryllium oxide to continuously obtain an indication of the amount of said toxic particles in the gaseous fluid.

It is also an object of the present invention to provide a method of periodically sampling and continuously, quantitatively determining the amount of relatively fine particle of a toxic material in a fluid medium such as air.

It is an object to provide a portable self-contained unit for periodically sampling and continuously providing an electric signal which corresponds to the quantity of toxic dust particles in a gaseous fluid such as air.

It is an object to provide an apparatus for and an approved method for continuously sampling an atmosphere such as a plant atmosphere for toxic amounts of relatively fine particles of a material such as beryllium oxide by collecting a sample of particles from a measured gaseous volume, burning the sample to produce light waves therefrom, and transducing the light emitted from said sample particles into electricity to thereby obtain an indication of a measurement of the amount of toxic particles in the gaseous fluid.

It is an object to provide an apparatus for collecting and recording the amount of relatively fine solid particles of a given material and airborne dust or other dust borne in or carried by a gaseous fluid.

It is an object to provide a method for collecting and recording the amount of relatively fine solid particles of a given material in an airborne dust or a dust carried in a gaseous fluid.

It is an object to provide an apparatus for determining the dangerous amounts of beryllium oxide or other toxic material in atmospheric air in which pumping means is provided for moving a given volume of air past a filtering point, conveyor means is supplied for moving a filter with the particles lodged thereon to a burning position, preferably sealing means is provided to seal the particles on the filter to prevent losing the same, burning means is provided for burning the particles, and means is provided for transducing the energy from a selected band of light into electricity to thereby give an indication of the amount of beryllium oxide particles or other given toxic matter, indicated by the selected light band of the spectrum, in a measured volume of air, and novel control means is provided for coordinating the operation of said pumping means, said conveyor means, and said burning means whereby a first sample can be collected and moved to the burning position for burning thereof while a second sample is being collected for subsequent burning.

Other objects will be apparent from the following specification, appended claims and the drawings, in which:

FIG. 2 is a left hand side elevational view of the analyzing unit of FIG. 1 showing a recording instrument and an indicating instrument used to measure the amount of toxic particles in the gaseous fluid;

FIG. 3 is a right hand side elevational view of the analyzing unit shown in FIG. 1;

FIG. 4 is a top plan view taken along the lines indicated at 4—4 in FIG. 1;

Figure 1:
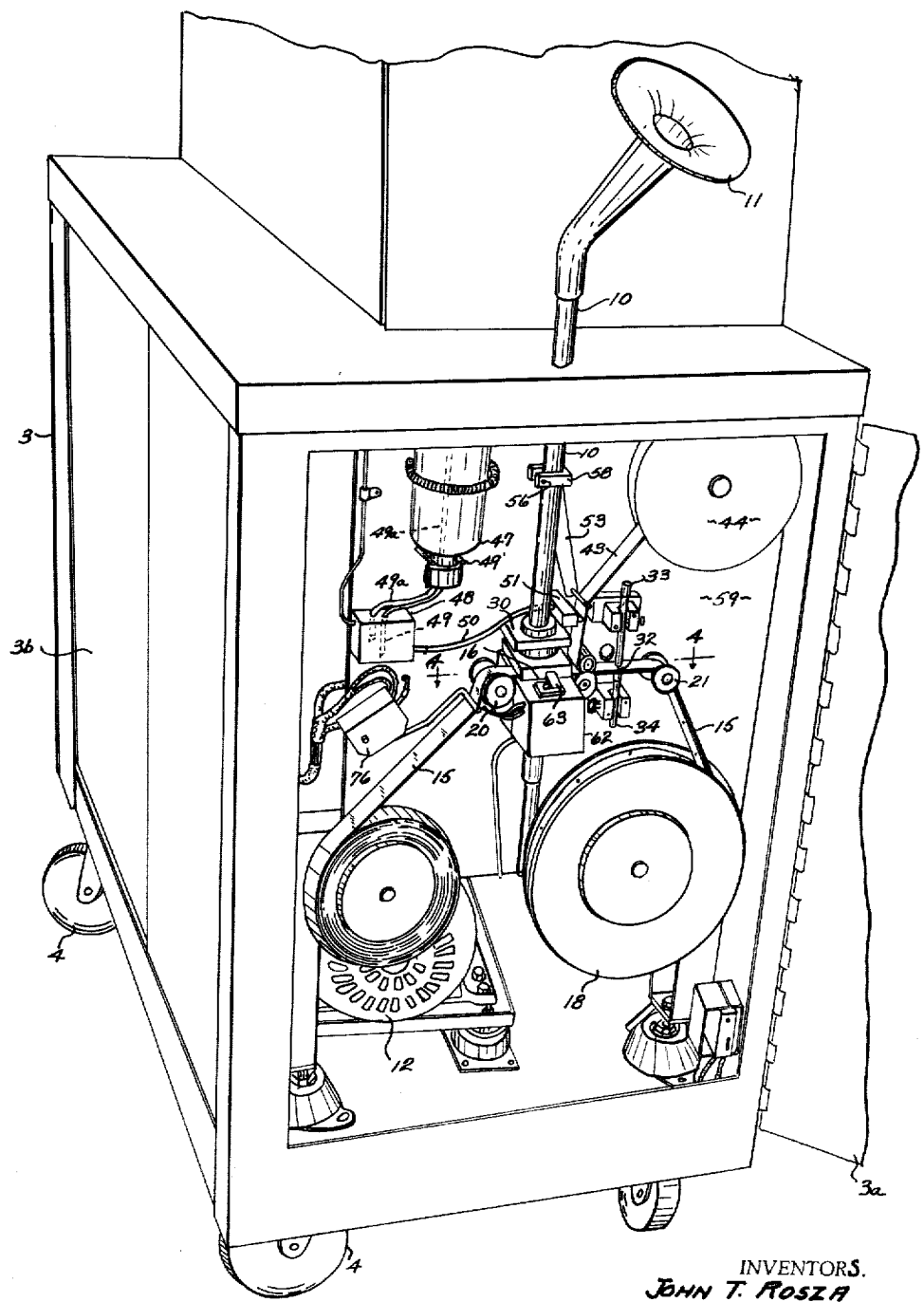
FIG. 1 is a perspective view of a portable self-contained unit (with the nearer end wall removed) of the present invention for continuously sampling and measuring the amount of toxic particles in a gaseous fluid such as air.

FIG. 6 is a graph illustrating the sampling, burning, and measuring phases of the monitor shown in FIG. 1, the above phases being coordinated to automatically follow each other and provide a self-contained analyzer unit; and, FIG. 7 is a schematic wiring diagram of one embodiment of electrical control circuit shown in its operational relationship with the several mechanical and electronic components of the apparatus of the present invention.

The present invention provides a method of continuously and quantitatively determining and indicating the amount of relatively fine particles of a toxic material such as beryllium oxide in a fluid medium such as air. The method as shown comprises the steps of collecting a plurality of said particles on a porous filter paper to obtain a sample, measuring the gaseous volume pulled through the porous paper to collect the sample, burning the sample, transducing the light from the burning of the sample into electricity so as to give a continuous signal of electricity corresponding to the quality of the toxic material in the fluid medium.

The present invention also includes an apparatus for practicing the same method and which comprises a cabinet 3 housing sampling, burning and measuring equipment about to be described. The cabinet 3 is provided with doors 3a, 3b and 3c and is suitably mounted on caster wheels 4 to provide a portable self-contained monitor. The apparatus is suitable for sampling and continuously reporting the amount of a toxic particle in a plant atmosphere, which particles are in the form of an airborne dust such as beryllium oxide. In the analyzing unit shown in the figures and, as best seen in FIG. 2, the cabinet 3 supports a smaller instrument cabinet above, containing a recording instrument 5 and an indicating instrument 6. The instruments 5 and 6 are used to report the amount of toxic particles in the gaseous fluid arrived at by measuring the quantity of electricity obtained from burning a given sample of toxic particles.

As seen in FIG. 1, for example, the analyzing monitor comprises a sampling tube 10 having an enlarged air intake portion 11 into which the atmosphere to be tested is drawn. The air, which includes dust particles borne therein is drawn into and through tube 10 by suitable means which preferably includes a vacuum pump 12 to provide a dust sample 14. The dust sample is collected on a filter tape 15 which is moved across the filtering point 16 from a supply reel 17 to a take-up reel 18. The filter tape is advanced by a driving roll 19 with the aid of idler rolls 20 and 21. The driving roll 19 is driven by means of a motor 22 which rotates a spur gear which in turn drives a spur gear 24 mounted on a common shaft 25 with the driving roll 19.

Further describing the tape drive system, the take-up reel 18 is mounted on a shaft 26 having also a sprocket 27 rigidly secured thereon. The tape take-up reel 18 is driven by the motor 22, being rotated by means of a roller chain 28 (see FIG. 5) which is mounted between a sprocket 29 provided on the driving shaft 25 and the sprocket 27.

In order to collect a sample on the filter tape 15, the air to be sampled is brought to the filtering point 16 through intake tube 10 and through a filter head 30 mounted on its free interior end and located, in the embodiment illustrated in FIG. 1, just above the filtering station 16. The filtering head is moved upwardly a very short distance, enough to clear the tape 15, when the tape is advanced. After the movement of the tape, the filtering head 30 is repositioned over the filter tape and an airtight fit is provided therebetween by suitable means such as a sealing ring.

In accordance with the present invention, the filtered sample is moved from the filtering point 16 to a burning station 32 which includes two electrodes 33 and 34 on opposite sides of the tape between which an arc is produced to burn the sample. When the sample is transferred from the filtering point 16 to the burning point 32 by the movement of the tape in the embodiment shown in FIG. 1, the tape advances about three inches.

After the tape has advanced the sample 14, it is burned by the electrical discharge between the electrodes in order to measure the amount of toxic material such as beryllium oxide therein. The burning operation may last for a predetermined period such as 30 seconds in the embodiment shown in FIG. 1. The combustion of the particles causes the emission of various wave lengths of light including those from beryllium oxide. The resultant beryllium oxide light waves pass through a lens 34a where they are directed to a monochrometer 35. The light waves are filtered out by the monochrometer 35 and the filtered beryllium oxide light waves strike a photomultiplier tube 36 where the light energy of the beryllium oxide wave is transduced into electrical energy and the amount thereof reported by the instruments previously described, namely, recording instrument 5 and indicating instrument 6. Thus, the instrument 6 visually indicates the amount of toxic beryllium oxide dust included in the sample burned and transduced, while instrument 5 provides a graphic record thereof.

In accordance with the present invention, the means for collecting the sample, the means for burning the sample, and the means for transducing the light energy from the burning sample into electricity are each preferably coordinated and synchronized by means such as an electrical control circuit as is shown in FIG. 7, to thus provide a portable self-contained monitor which has a periodic sampling period and a relatively continuous measuring period. Thus, particles of any given toxic material in airborne dust in plant atmosphere can be efficiently and easily captured by the monitor and accurately measured using a spectrographic technique.

The coordination and sequencing of the various steps or phases of collecting, burning and measuring in one recurring cycle can be easily shown by means of the graph of FIG. 6.

The portable self-contained beryllium oxide-air monitor illustrated in the drawings has two functions. First, it provides a continual visual indication (indicating instrument 6), and a continuous graphic indication (recording instrument 5) of the amount of a particular substance (beryllium oxide), found in the airborne dust samples. Secondly, the monitor provides both a visual and an audible alarm when a predetermined dangerous level of beryllium oxide is found to be present in the plant atmosphere.

The instrument operation is both spectrographic and electronic in nature, the above described functions, as is above mentioned, being performed in a recurring cycle comprising four distinct phases as shown in a preferred embodiment illustrated in the drawings, and which operation is automatically synchronized by an electrical control circuit such as is illustrated in FIG. 7.

In the first phase, as seen by the top bar in the graph shown as FIG. 6, a spark generator 37 is preferably used to burn a portion of the filter tape 15 upon which dust has been deposited during the previous cycle to form the sample 14. In the embodiment shown in FIG. 1 as well as FIG. 6, the burning step lasts for 30 seconds while the filtering step lasts for 60 seconds.

Returning to the burning process in the first phase, light from the burning dust particles is converted into electrical energy by control means of the aforesaid electrical circuit, including the photo-multiplier tube 36, and if a toxic level is found during this stage, said control means may be utilized to energize a suitable alarm system, such as an alarm light 40 and horn 41.

The second phase, represented by the second bar from the top and located under the bar representing the first phase in FIG. 6, has a 60 second duration which begins substantially at the same time as said first phase, and which, in addition, is likewise synchronized by the aforesaid electrical control circuit. During this second phase of the recurring automatic instrument cycle, air is pumped in through a portion of the filter tape 15 at a sampling point 16, the air being pumped through sampling tube 10 by suitable means such as a vacuum pump to be described in detail later. The tape is obviously wider than the diameter of tube 10 at point 16.

A third phase starts upon completion of the second phase. The third phase, in the embodiment shown in the drawings, is approximately 5 seconds in duration. During this phase, a motor driven system advances the sample 14 on the filter tape 15 approximately three inches to the burning station or area 32 in readiness for the next succeeding first phase. While the sample and filter tape is being advanced, in accordance with the present invention, the sample is automatically sealed on the tape 15 by suitable means, which in the embodiment illustrated in the drawings, is preferably an adhesive tape 43. The sealed sample, being disposed between the upper tape 43 and the lower tape 15, is transported to the sparking station or area 32. The sampling area 16 then receives a clean area of filter tape under the filtering head 30 for the next sample to be deposited thereon in the next succeeding second machine phase.

It is preferable in the present invention that the sample be sealed while being advanced to the sparking area since it has been found that the sparking operation oftentimes tends to cause a scattering of unburned particles when the electrodes 33 and 34 are discharged. It has been found that, generally, when the dust samples are not sealed in place on the filter tape, there is great danger that unburned dust particles will be scattered about particularly during the initial phase of the spark discharge. If unburned particles are scattered and thus not burned, a false reading would be indicated. This false measurement can be particularly bad when a worker is breathing an atmosphere containing dangerous amounts of beryllium oxide, and the measurement of the particle actually burned has not reached a predetermined danger level due to loss of sample particles of toxic material prior to said burning.

Figure 5:
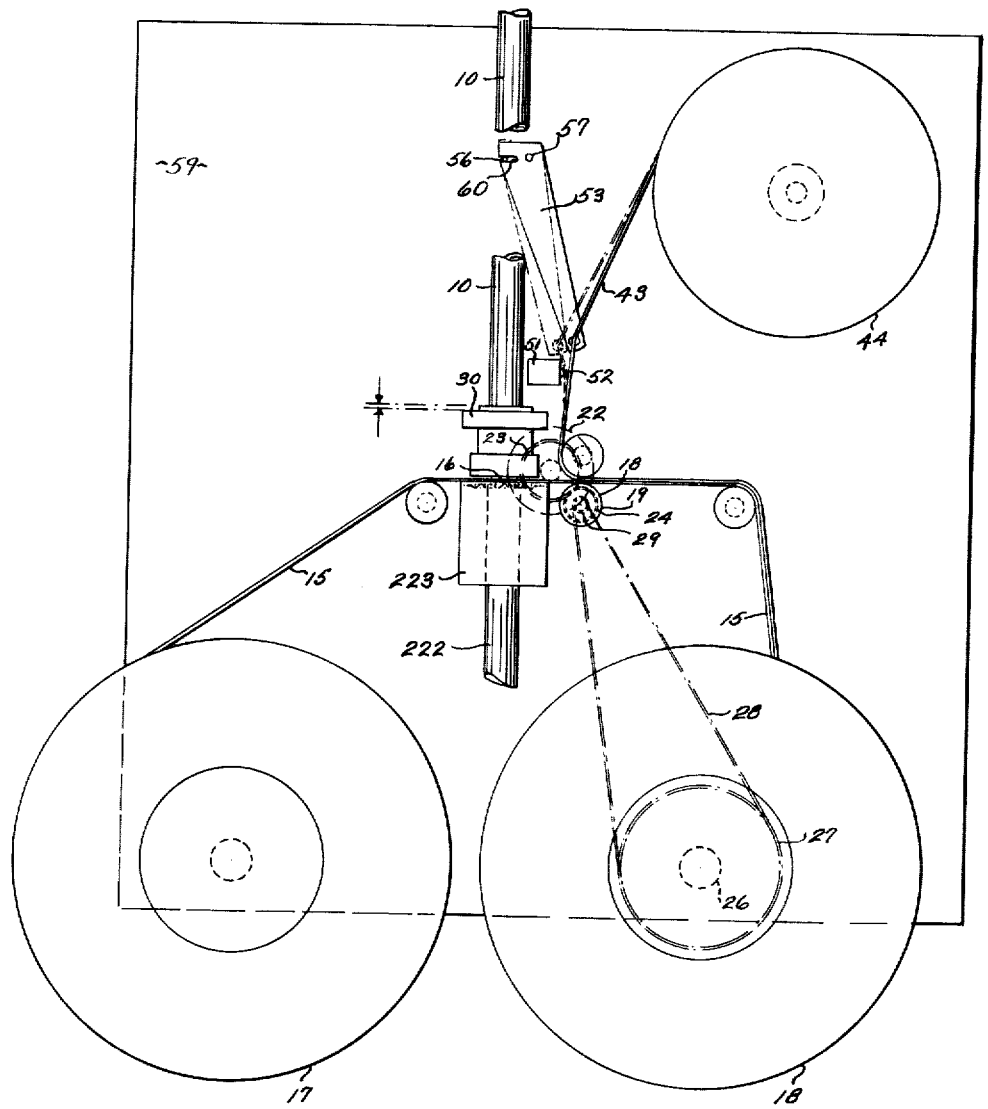
FIG. 5 is a somewhat diagrammatic front elevational view of the sampling and analyzing monitor of FIG. 1 illustrating the means for conveying a filter tape to a filtering station and then to a burning station and illustrating a means of sealing a filtered sample on the filter tape so that the subsequent discharge of the electrodes will not scatter particles of the sample before they are burned.

In accordance with the present invention, as seen in FIG. 1 and also in FIG. 5, the sealing means comprises a sealing tape 43 which is stored on a supply roll 44. The tape 43 comprises a porous paper having preferably a water-activated and water soluble adhesive layer on one side thereof. In sealing the sample on tape 15, the adhesive side of the sealing tape 43 preferably is moistened with water by a wetting means including a water supply bottle 47, a reservoir 48, a reservoir outlet tube 50 and a wetting block 51 having a moist felt pad 52 thereon. A short feed tube 49 is provided between the bottle 47 and reservoir 48. As also best seen in FIG. 1, a small length of tube 49a may also be provided between supply bottle 47 and reservoir 48 to adjust the water level therebetween and avoid flooding the reservoir.

The sealing tape 43 periodically (each time the tape 15 is advanced) is pushed against the moist felt pad 52 to thereby wet the tape 43 for its subsequent sealing function.

In accordance with the present invention, it is also important that the sealing tape and consequently the filter tape be wet enough to help prevent the scattering of unburned particles when the sample reaches the burning point 32 and is subjected to the discharge of the electrodes. The moisture also helps prevent arcing and localized burning. In the embodiment shown, there is about 4 inches of sealing tape 43 between the moistening point at the felt pad 52 and the burning station 32.

Continuing to describe the moistening means for wetting tape 43, the tape 43 is forced lightly against the felt pad 52 by a lever arm 53 having a pin 54 at its distal end which engages the underside of tape 43 and pushes it against the moist pad. In order to obtain a smoother wetting and wiping action, the moistening surface may be a roll having a wet outer surface, which surface rolls with the travel of the tape 43 to prevent any chance of wiping the tape so hard that some adhesive is removed therefrom.

In order to moisten the tape by the movement of pin 54 of arm 53, the arm is pivotally connected to the inlet tube by means of a pin 56 rigidly connected to said tube. The arm pivots about pin 57 of guide collar 58, the pin 57 being rigidly mounted on panel board 59 so that the pin 57 does not move when the inlet tube is raised and lowered.

Thus the arm 53 is swung about its pivot point 57 by the upward travel of the tube 10, the pin or set-screw 56 exerting pressure against the upper side of a slot 60 in the arm 53 to shift the arm and subsequently the tape 43 to second or moistening position indicated in FIG. 5 in dot-dash lines.

As seen in FIG. 1, the tube 10 may be raised and lowered by a solenoid 62 having an armature 63 which raises and lowers the filtering head 30.

As an alternate means of raising and lowering the tube 10 during the tape advancing step using a solenoid similar to solenoid 62, the tube 10 can be moved vertically by a lever arm having one end attached to the tube near the collar 58. The other end of the lever arm can be rigidly connected to an armature of a solenoid, the armature moving the lever arm about a pivot point between its ends to force the tube up and down. This arrangement, particularly when pillow blocks are used as bearing guides around the tube 10 near the filter head, and when the tube end of the lever arm is connected to a plate having springs between it and a collar, such as collar 58, provides relatively chatter-free movement of the filter head during the advancing stage of the tapes 15 and 43.

Continuing the description of the sequence phases shown in FIG. 6, a fourth phase (illustrated as the bottom bar of FIG. 6) is provided which is a delay period of approximately 7 seconds in the embodiment shown in FIG. 1. This delay period allows the various circuit timing components of the aforesaid electrical control circuit to reset before initiating a new machine cycle. To aid in the continuous sampling in an industrial plant atmosphere, each of the phases is indicated by the monitor on an instrument panel 64 by indicating lamps to be hereinafter referred to in greater detail.

As previously mentioned, the cycle operation of the aforementioned measuring and indicating components of the instant machine are automatically and synchronously controlled by an electrical circuit, a preferred embodiment of which is shown in FIG. 7.

Briefly, the instant configuration of electrical control circuit C includes the aforementioned photo-multiplier tube 36, the output electrode of which is connected to the input of a conventional micro-microammeter 65 having an amplifier portion 66 to which the multiplied signal from said tube is applied and further amplified, said signal being thereafter presented to the visual meter indicator 6 of said microammeter which is thus effective to give a visual indication of said signal. The aforementioned conventional strip chart recorder, as identified by the reference numeral 5, may also be connected to the output of the aforementioned amplifier portion 66 in the micro-microammeter unit 65 and intended to be operable so as to give a written or recorded indication of said amplified signal.

As the sample 14 is presented to the spark gap at station 32 and ignited, the light emanating from the burning of said sample is directed to the aforementioned monochrometer 35 wherein the light waves characteristic of beryllium oxide are passed and directed to the target anode of the aforementioned photomultiplier tube 36. Obviously this device may select some other band of the spectrum if one is testing for some other material in the atmosphere.

To provide for the proper operation of the photo-multiplier tube 36, the instant electrical control circuit includes a high voltage power source identified in its entirety by the reference number 67 and which is intended to provide a half-wave rectified voltage of approximately minus 700 volts D.C. which is then connected to the first anode element of the aforementioned photo-multiplier tube 36, the proper potential for each of the remaining anode elements of said tube being provided by voltage divider network 36a connected between said elements.

The aforementioned micro-microammeter 65 is likewise provided with a suitable power source, identified in its entirety by the reference numeral 68, and which is operable to provide a 25 volt D.C. potential to said microammeter.

The aforementioned spark generator is likewise provided with its separate power supply, identified in its entirety by the reference numeral 69 and which, in addition, is preferably connected to the output of a suitable voltage regulator 70 so as to be energized by a substantially constant potential. Said power supply is intended to provide a potential of approximately 115 volts across the spark gap of said generator.

The instant embodiment of electrical control circuit also includes a plurality of relay and solenoid components, each of which have contact elements connectable in said control circuit as will be further identified in the operational disclosure of said circuit now to follow and which thus function to provide for sequentially sampling and measuring of the beryllium oxide material sample.

A power input cable 71 is adapted to supply the control circuit with electrical power from a 115 volt, 60 cycle power source. The cable 71 is connectable into an appropriate receptacle and said circuit includes a "standby-operate" switch 72 which is normally in its standby-open position, and a master switch 73 connected in series with one side of the input cable to thus provide a manual control of said power source to said circuit.

Assuming that the instant apparatus has previously completed a cycle of operation whereby a material sample 14 has been collected and is now awaiting the next succeeding operating cycle, closing the switches 72 and 73 to their "on" position sets up the following conditions:

(1) Electrical power is applied to a "tape" switch 76 of said circuit which is in its normally "open" position. As illustrated in FIG. 7, the normally "open" position of switch 76 is designated as NO, and at its closed position as NC. Voltage is now present at the contact points 77 and 78 of said switch. Voltage is also applied to a "power-on" lamp 79, and a switch 80 included in said circuit which may also be hereinafter identified as an "advance" switch. Switch 80 is a manually operated switch which is actuated by the operator to start the control circuit in operation. In starting the circuit operation, the advance switch 80, having switch points 81 and 82, is manually set to its "automatic" position as is shown in FIG. 7 with its contact point 81 engaged.

(2) With the "advance" switch thus actuated, the "tape" switch 76 is then manually operated so that its contact 78 is connected to said line voltage to complete the circuit to the aforesaid "standby-operate" switch 72.

(3) With the closing of master switch 73, transformer 83 of the 25 volt D.C. power source is energized to thereby provide power to the aforementioned micro-microammeter. The secondary winding of the transformer 83 connects to a rectifier 84 through leads 85 and 86. The output of rectifier 84, which is preferably a full wave bridge type, is, as previously pointed out, 25 volts D.C.

(4) Closing the master switch 73 also connects a pair of fan motors 87 across the line, said motors being preferably connected in parallel and through circuit connection 74c of said master switch to one side of the input cable 71 and through switch 76 to the opposite side of said input cable. In this manner the interior of the cabinet 3 is continuously being cooled during the operating cycle of the instant apparatus.

(5) A regulated 115 volt A.C. potential from a voltage regulator is applied to the power supply of the spark generator 37 to thus provide the high voltage spark potential at the burning station or gap 32. With the input potential to the spark generator being regulated, the resultant spark potential is thus maintained substantially constant, and the material sample is thereby ignited by an arc of substantially constant intensity, whereby an exact measurement of the toxic or non-toxic condition of said sample may be readily indicated.

(6) The high voltage power supply 67 for the photo-multiplier tube 36 is energized. The power supply 67 has a transformer 105 comprising a primary winding 106 and a secondary winding 107, the output circuit of said power supply being connected to said secondary winding and carrying direct current power of −700 volts D.C. to the first target anode of the photo-multiplier tube 36.

(7) With said master switch 73 thus actuated, the power supply 68 for the micro-microammeter 65 is likewise energized, said meter being shown somewhat diagrammatically in FIG. 7 and which may be of a suitable conventional design such as used in the Keithley Model 400 micro-microammeter (made by Keithley Instruments Inc., Ridgewood, N.J.). Thus the micro-microammeter is in a standby condition of energization awaiting a signal from the photo-multiplier tube 36.

The recording instrument 5 is likewise connected to the aforementioned 115 volt line supply and is also energized. The instrument 5, thus, is ready to receive a signal from the amplifier portion 66 of said meter 65 and thereby provide a recorder or written indication of the same. Again, the recorder 5 is merely diagrammatically illustrated, and may be of any suitable conventional design known to the artisan.

During a warm-up period of a suitable time duration, the filter tape 15 is checked to see that it is properly threaded on its aforementioned supporting and advancing mechanism, all timers in the instant control circuit hereinafter to be referred to are re-set, the monitor doors of the cabinet 3 are checked to be sure that they are porperly closed.

It should be noted that each of the cabinet doors (3a, 3b and 3c) is provided with an interlock 113, 114, and 115. The interlocks are connected in series into the high voltage spark generator circuit, and if any of said doors is inadvertently opened, the high voltage to the spark gap is discontinued. This safety feature thereby guards against injury to the operator working inside or closely adjacent the cabinet 3 in case adjustment and/or replacement of one of the components therein is required. A switch 119, hereinafter also referred to as a "filter switch," is manually set in its "auto" closed position, and the monitor is thus ready for continuous operation.

After said warm-up period expires, the switch 72 is actuated to its "operator" position to simultaneously initiate the following operations:

(1) A circuit is established between the aforesaid voltage regulator 70 and the spark generator 37 which is effective to energize the latter and thereby provide a spark potential at the burning station 32.

(2) A spark indicating lamp 131 connected across the spark generator power leads, 133 and 134, is illuminated, thus giving a visual indication of the energization of said generator.

(3) The motor 135 of a suitable air blower is seen to be connected across the A.C. input power to the aforesaid control circuit and thus is energized to cause an air stream to be directed at the burning station 32 and thus assist in the dissipation of heat at the same.

(4) A filter pump motor 139 likewise connected across the aforesaid A.C. input leads is also energized with said blower motor 135 to thereby provide a suitable negative pressure or vacuum for the sampling head as previously mentioned.

(5) A filter indicating lamp 140 connected in series with the aforesaid switch 72 and the A.C. input leads, is illuminated, thus indicating that a new sample is being taken during the first phase in the instant cycle.

(6) A "spark" timer 145 connected in parallel with said lamp 140 is also energized, and in the instant embodiment said timer is intended to have an energized period of approximately 30 seconds.

(7) A "filter" timer 148 is also energized, said timer having preferably a 60 second energized period. The timer 148 is provided with contacts 149 in the aforesaid spark generator input power circuit and the contacts are in their closed position during said energized period.

(8) Voltage becomes available through the rectifier 84 into an alarm system comprising the alarm horn 41 and the alarm signal lamp 40.

During the above described interval (which takes place when the "standby-operate" switch 72 is in the "operate" position, and in particular during the first phase of the operating cycle), the following is taking place within the instrument:

(1) The previously collected sample and area of tape thereunder (about ⅜" diameter circle in the embodiment shown in FIGS. 1 and 4) is being sparked by the spark generator 37.

(2) Light from the burning particles is directed to the monochrometer 35 which filters and passes the portion thereof characteristic of beryllium oxide and directs the same to the photo-multiplier 36 where said light energy is converted into electrical energy.

(3) The output signal of the photo-multiplier tube 36 is applied across a capacitor 150 located in the input circuit of the amplifier 66 of the micro-microammeter 65.

The capacitor 150 functions to integrate said input signal prior to its being amplified in said amplifier portion. In addition, said capacitor is preferably of such magnitude as to provide an operating signal to said amplifier for approximately 30 seconds. The amplified signal input is applied to the meter relay part 151 of the microammeter 65 and to the recorder 5.

(4) A time delay relay 152 is energized to open its contacts 153 in the circuit for a solenoid 156 of the aforesaid pump motor 139, whereby said solenoid is deenergized to thus allow a negative pump pressure or vacuum generated by the aforementioned pump to pull air ladened with sample particles down through the intake 11 of the sampling tube and through the area of filter tape under the filter head 30 whereby said particles are deposited on said tape.

After a 30 second interval, which is the duration of the first phase for the instant embodiment of machine cycle, the spark timer 145 times out to open its contact 158 in the spark generator primary circuit thus deenergizing said generator and its indicating lamp 131.

The first phase of the machine cycle ends, however the second phase continues for an additional 30 seconds as previously described and illustrated in the legend of FIG. 6. The "spark" timer 145 remains energized for the remainder of the second phase during which time the aforesaid filter head 30 completes its sampling of the new air specimen. At the end of the second phase the "filter" timer 148 times out to terminate the second phase and to initiate the third phase. At this instant the following simultaneously occurs:

(1) "Filter" timer switch contacts 160 and 161 are actuated to the open position therefor disconnecting the "spark" timer and the "filter" indicating lamp 140 from their power source.

(2) A relay 165 energizes, opening its contacts 166 in the spark generator primary circuit, acting therefore as a fail-safe feature in the event the spark timer 145 inadvertently is adjusted by hand to again close its contact 167.

(3) The time delay relay 152 is energized which switches the voltage through switch 153 to energize by-pass solenoid 156 and lift solenoid 62. The operation of the by-pass and lift solenoids stops the air flow through the filter paper and lifts the sampling head 30 from the filter tape 15.

(4) The wetting solenoid relay 177 is energized, closing its contacts including contact 178 in the 25 volt D.C. rectifier circuit. The closing of contact 178 energizes the solenoid 180, which positions the adhesive tape 43 against the wetting block 51, as previously described.

A "tape advance" motor 181 is energized, which action advances the dust sample on the tape 15 from the filtering point to the burning station 32 to thus ready the instrument for the next measuring cycle. In the present machine embodiment as is shown in FIG. 1, the tape moves about 3 inches in transferring the sample from the filter station to the burning station.

(6) An "advance" indicating lamp 183 is ignited to indicate that the above described advance of the filter tape is taking place.

An "advance" timer 184 is also energized to time out a period of 5 seconds, the duration of the third phase in the instant machine cycle of operation.

All of the above described steps occur during the five-second third phase. Meanwhile, the "spark" timer 145, deenergized by the action of the filter timer 148, instantly closes its contacts in the spark generator primary winding circuit and resets to zero. The "filter" timer 148 remains energized, holding its contacts 189 and 190 in their open position until the "advance" timer 184 times out.

When the advance timer does time out, the third phase ends, the fourth phase starts whereby the following instantly takes place:

(1) A contact 192 for the "advance" timer is actuated to disconnect the voltage from the filter timer and to apply said voltage to a ratchet relay coil 194.

(2) The filter timer is thus deenergized and resets to zero, causing its contacts (189 and 190) to instantly reset to the normally-closed position therefor.

(3) The "advance" timing lamp 183 is extinguished indicating that the advancing of the filter tape has ended.

(4) Relay 165 deenergizes, closing its contacts 166 in the spark primary circuit.

(5) The "advance" motor 181 stops, halting the tape travel.

(6) The wetting solenoid relay 177 is deenergized which, in turn, deenergizes the wetting solenoid 180. The deenergization of solenoid 180 moves the aforementioned lever arm 53 from its position illustrated in phantom in FIG. 5 to its solid line position to thereby remove the adhesive tape 43 from the felt pad 52.

(7) Time delay relay 168 is deenergized which starts a 3-second pneumatic delay before actuating its contacts to a normally open position, allowing the filter tape to come to a stop before the by-pass and lift solenoids (solenoids 62 and 156, respectively) are deenergized. The delay of three seconds permits the filter head 30 to be lowered to the tape 15 once again for the next succeeding sampling cycle.

At this point, air flow is returned through the filter paper under the filter head 30 so that sampling of plant atmosphere may once again take place. The air, as previously indicated, is introduced through the sampling tube 10 and down through the sampling head 30 to the tape disposed therebelow.

The holding action of the ratchet relay coil 194 has been described. When it receives its first pulse at the instant the timing out of the "advance" timer 184 times out, it closes contacts 199, 200, 201 and 202 whereby the following action occurs:

(1) The primary circuit of the spark generator is opened by contact 199 an instant before the contacts 166 of the relay 165 are closed, and in this manner prevents the starting of the high voltage spark prematurely.

(2) Voltage is applied through contact 200 to a time-delay relay 203 which provides a delay of seven seconds before closing its contacts.

(3) The "spark" timer circuit is opened by contact 201 before the "filter" timer 184 resets its contact 160, 161.

(4) A relay 205, through contact 202, is connected to the output side of the 25 volt D.C. rectifier 84 in the micro-microammeter circuit. The relay 205 is closed in the fourth phase and the closing of its contacts 206 short out the remaining accumulated signal charge on the integrating capacitor 150 of the amplifying circuit for the micro-microammeter whereas contacts 207 of said relay 205 open to deenergize the coil of relay 211.

During this interval all the timing devices are resetting their contacts to their normally deenergized positions, and the time delay relay timer 203 is timing a period of approximately seven seconds the preferred time duration for the fourth phase in the instant operating cycle, thus allowing sufficient time for said devices to be re-set to await the start of the next cycle.

Contacts 212 are provided for the time delay relay 203. At the end of the seven-second delay period just described, the contacts 212 close to pulse the ratchet relay 194 and, in turn, returns its contacts (199 to 202) to their original position.

After the ratchet relay is pulsed, the circuit conditions are as follows:

(1) The relay 205 is again energized to open its contacts 206 thus removing the shunt from the neutralized integrating capacitor 150. This action returns the meter 6 and recorder 5 indications to zero levels.

(2) The contacts 207 of relay 205 are closed, thus closing the circuit of the relay 211.

(3) The first phase of the second recurring cycle then begins.

The above described circuit operation is the operation for normal conditions in which less than dangerous amounts of toxic dust is present in the atmosphere. Now, the circuit operation for alarm conditions will be described.

As noted in FIG. 7, the relay 211 is in series with the meter relay coil 151. When alarm conditions are present, the relay 211 is energized by the contact of an actuating meter arm 214 of the meter relay 151 with a preset alarm point 215.

Thus, when the amount of toxic material in the dust sample is enough to drive the meter arm 214 to the alarm point 215, the relay 211 is energized which, in turn, energizes relay 217 through contacts 218. Contacts 219 are provided in the relay 217 circuit which are closed thereby to energize the alarm lamp 40 and the alarm horn 41.

The alarm lamp remains on and the horn blows until one of the following conditions occurs:

(1) The pulse of the ratchet relay 194 at the end of the "advance" (third) phase causes relay 205 to open the relay 211 and, in turn, to deenergize relay 217. This action, thus, deenergizes the alarm system and returns the amplifier output to the contact meter 151 by the closing of meter relay contacts 221.

(2) The "alarm reset" button is depressed manually which opens contacts 219 and the integrating capacitor 150 is manually shorted to discharge its accumulated charge.

Having described the preferred electrical circuits for operating the portable self-contained monitor, some of the mechanical means which are synchronized and operated thereby will now be discussed in more detail.

The preferred means for sealing the sample 14 on the filter tape 15 already has been described since it is of great importance in obtaining proper measurements. Any detergent or wetting agent such as an alkyl aryl sodium sulfonate including decyl benzyl sodium sulfonate may be used in the water supply 47.

As previously indicated, the means for collecting the sample includes a vacuum pump 12. To trace the flow of air in and out of the monitor, air is brought in through opening 11 of tube 10 and down therethrough past filter head 30. The air passes through filter paper tape 15 which is preferably a fine filter paper that is capable of catching fine particles including those as small as about three-tenths or four-tenths of a micron in diameter.

After passing through the filter paper, the air travels through a conduit 222 which is connected with an airtight seal to intake tube 10 and preferably has the same internal diameter. The upper portion of the tube 222 is vertically aligned with tube 10 and is disposed within a sampling table member 223 which is directly under the filter head 30. When the head 30 is clamped in filtering position the sealing ring and filter paper 15 act as gaskets between the head 30 and table or platform 223 so that there is no escape of air between tube 10 and tube 222.

Continuing to trace the air flow and as best seen in FIG. 2, the conduit 222 is bent so that its end opposite the platform 223 is connected to a pump inlet tube 225. Thus the air flows through conduit 222, through inlet tube 225, and into the positive displacement vacuum pump 12. The pump may be high vacuum air pump such as Model 1065 sold by the Gast Manufacturing Corporation having a ½ H.P. drive motor and a recommended maximum vacuum of 28" Hg for continuous operation.

Continuing to describe the air flow, the air is exhausted out the pump 12 through exhaust tube 226 having a muffler 227 connected thereto and into a rotameter 228 which measures the air flow through the sampling system.

In the embodiment illustrated in the drawings, a preferred rotameter is shown which is a "Tapor-Flo" plastic flow meter, series 8000, size 500, having an accurately tapered orifice which varies the area for flow rather than a tapered tube. For sampling in plant atmospheres, it has been found convenient to sample at the rate of about three cubic meters of air per hour or about 2½ to 3 times the normal breathing rate of a person.

The means for burning the dust sample collected by the above described air flow has been described. By way of discussing the burning means in greater detail, it has been found that the preferred electrodes are those made of copper and provided with glass fiber sleeves, it having been found that electrodes such as those made of graphite have to be changed every 15 to 30 minutes and, thus, are not satisfactory for an instrument that should run for an eight-hour shift unattended. The glass fiber sleeves apparently restrict the field of arc and make the copper electrodes last much longer. Otherwise, an electrode tends to form a copper oxide coating and its resultant spark patterns are erratic.

Thus, the preferred burning means comprises the copper electrodes 33 and 34 and their physical relationship with the read-out system is best illustrated in FIG. 3. As therein shown, the light emitted from the sparking of the electrodes passes through the monochrometer 35 and into the read-out system.

In the read-out system of the embodiment shown in the drawings, the capacity of the condenser 150 is of about one-fourth microfarad. This size of the capacitor gives nearly a full-scale deflection for amounts of beryllium oxide up to about 2 micrograms per cubic meter in the sample. The size of the condenser or the number of condensers can be increased for heavier concentrations of beryllium oxide and still provide a full-scale deflection. Heavier concentrations of beryllium oxide or other toxic material can be handled conveniently by placing filters such as neutral density optical filters in the path of the light from the burning sample.

The monitor can be adapted easily to handle wide ranges and types of toxic dust concentration by varying the size or number of integrating condensers, the number of filters and the sampling time itself. Thus, the present invention provides a versatile, yet compact and mobile air monitor in which relatively large samples may be collected, burned and measured in an automatically recurring cycle.

While outstanding results have been made and continuously collecting and recording the amount of beryllium oxide in airborne dust, other elements and compounds which present toxic aerosol hazards may be continuously analyzed according to the present invention. Some of the elements suitable for collection and recording in a continuous monitor system as described herein are nickel, silicon, lead, zirconium, vanadium, chromium, cadmium, thallium, germanium, antimony, aluminum, boron, arsenic, and manganese and compounds thereof.

While, in the embodiment shown in the drawings, only one element was measured, two or more elements may be measured from the same burning sample by the use of two or more monochrometers, or a duo-line monochrometer and the use of suitable measuring instruments for each of the filtered light waves. Two or more toxic elements may also be measured using two or more optical filters to sort out the desired bands of light.

It is well understood that, in accordance with the provisions of the present statutes, variations and modifications of the specific invention may be made without changing the spirit thereof.

What is claimed is:

1. A method of quantitatively determining the amount of relatively fine particles of a toxic material in a gaseous fluid medium comprising a recurring cycle having the steps of collecting a plurality of said particles for a predetermined period on a filter to obtain a sample, measuring the gaseous volume required to collect said sample, burning the sample, transducing the light from the burning of said sample into electricity to give a continuous signal corresponding to the quantity of said toxic material in said medium, and thereafter repeating said recurring cycle of collecting, measuring, burning and transducing to thereby start a second cycle on a second sample before the first cycle is completed to continue to produce said continuous signal.

2. In an apparatus suitable for sampling a gaseous fluid such as air for the presence of toxic particles and continuously obtaining an indication of the amount of said particles in the gaseous fluid, means for collecting a first sample of said particles from a measured gaseous volume, means for periodically burning said sample to produce light waves from the burning of said particles, means for transducing the light emitted from said particles into electricity to produce a continuous electric signal, and means including an electronically operated spectrographic instrument for measuring the amount of said electric signal as an indication of the amount of toxic particles in the gaseous fluid, and coordinating means for repeating the use of the above mentioned means in a recurring cycle to thereby start a new cycle on a new sample before the first cycle on the first sample is completed.

3. In a system for determining the amount of particles of a given kind in dust borne in a gaseous fluid, means for collecting a sample of said dust including said particles on a filter medium from a measured gaseous volume, means for burning the sample to cause light to be emitted therefrom, means for synchronizing the collecting and burning of the sample, means for selecting a desired spectrographic band of light emitted from the sample and transducing that given band of light into electricity, means for measuring the amount of said electricity to thereby measure the amount of the given kind of particles in the measured gaseous volume, and coordinating means for repeating the use of said five means in a recurring cycle to thereby begin a new cycle on a second sample before the first cycle on the first mentioned sample is finished.

4. In an apparatus for continuously recording the amount of beryllium oxide present in air-borne dusts, means for periodically collecting a sample of air-borne dust including beryllium oxide particles on a filter paper from a measured gaseous volume, means for periodically burning said sample, means for transducing a band of light from said beryllium oxide into electricity, means thereafter for indicating the amount of electricity as a measure of the amount of beryllium oxide in the measured amount of air and coordinating means for repeating the use of said previously mentioned means in a recurring cycle to provide a first cycle and a second cycle, said second cycle being started on a second sample before the collecting and burning steps of the first cycle on the first sample are completed, said coordinating means including an electrical control circuit comprising a plurality of relay and solenoid components having contact elements connectable with said control circuit.

5. In an apparatus for collecting and recording the amount of relatively fine solid particles of a given toxic material in air-borne dusts, means including filter medium for collecting a sample of dust particles at a first point, means for pulling air through said filter medium and measuring the volume thereof, means for transferring the sample collected on the filter medium to a second point for burning of the sample, means for burning said sample, means for selecting a given band of light emitted from the burning of the particles of said toxic material in said sample, means for transducing that given band of light energy into electricity for measurement thereof to indicate the amount of dust particles of a said toxic material in the measured amount of air, and means repeating the use of said first four defined means in a recurring cycle.

6. In a system for monitoring air for a toxic amount of beryllium oxide, means for moving and measuring a predetermined given volume of air, means for collecting a first sample of dust particles from said given volume of air including filter paper upon which the particles are lodged, means for burning said sample including two electrodes, means for transferring the sample of particles lodged on the filter paper to a position between said two electrodes, means for sparking said electrodes to cause said sample to burn, means for synchronizing the collecting, transferring, and burning of said sample to thereby start collection of a second sample before the collection, transferring and burning of the first sample has been completed, and means for transducing light from the burning sample into electricity to give an indication of the amount of beryllium oxide in the given volume of air.

7. In an apparatus for determining the amount of toxic particles in air-borne dust, means for collecting a sample of dust particles on a filter paper, means for measuring the amount of air used to convey the dust particles to the filter paper, means for burning the sample including electrodes, means for moving said sample between the electrodes, means for sparking said electrodes to burn the sample, means for synchronizing the collection of the sample with the burning thereof by the electrodes, and means to transduce at least one predetermined band of light from the burning sample into electricity as a measurement of the amount of toxic particles in the air.

8. An apparatus as defined in claim 7 in which there is means for coordinating the collecting of the sample and the transducing of the light emitted from the burning sample into electricity whereby a new sample can be collected while the old sample is analyzed.

9. An apparatus as defined in claim 3 in which the means for selecting and transducing a given band of light energy into electricity includes a monochromator.

10. An apparatus as defined in claim 3 in which the means for selecting and transducing a given band of light into electricity includes an optical filter.

11. An apparatus as defined in claim 10 in which the means for measuring the amount of gaseous volume includes a rotameter.

12. An apparatus for determining dangerous amounts of beryllium oxide in atmospheric air comprising pumping means for moving a given volume of air past a filtering point, conduit means including a conduit having a sampling tube portion at one end open to the atmospheric air and the other end connected to the pumping means, said conduit means having a filter paper positioned between said inlet end and the end connected to the pumping means to collect particles in the atmospheric air, means for moving said filter paper with particles lodged thereon from said filtering point to a burning position suitable for burning the particles, means for burning the particles including electrodes, timing means for causing said electrodes to burn said particles after they are moved from the filtering point to the burning position, and means for selecting and transducing a given band of light from the burning sample into electricity and measuring the amount of the electricity as an indication of the amount of particles contained in given volume of air.

13. An apparatus as described in claim 2 in which said particles include beryllium oxide particles and said means for transducing and means for measuring the amount of electricity determine the amount of beryllium oxide particles in the measured gaseous volume.

14. A method of determining the amount of beryllium oxide present as dust in atmospheric air comprising a first cycle including the steps of collecting a sample of air-borne dust particles including beryllium oxide particles on a porous filter, measuring the volume of air used to deposit said particles of beryllium oxide on the filter, burning said dust particles including beryllium oxide particles with electrodes, selecting from said burning step a given spectrographic band of light corresponding to the beryllium oxide band and transducing the energy from said given band into electricity to thereby give an indication of the amount of beryllium oxide particles in the measured volume of air and thereafter repeating said steps of collecting, measuring, burning, selecting and transducing to start a second cycle for a second sample before the first cycle is completed, and thereafter repeating said steps to provide a plurality of cycles that are substantially the same as said first and second cycles.

15. An apparatus as defined in claim 2 in which the means for measuring the amount of electricity includes a microammeter.

16. An apparatus as defined in claim 12 in which the pumping means for moving the given volume of air includes a vacuum pump and a rotameter.

17. An apparatus for determining dangerous amounts of beryllium oxide in atmospheric air comprising pumping means for moving a given volume of air past a filtering point, conduit means including a conduit having a sampling tube portion at one end open to the atmospheric air and the other end connected to the pumping means, said conduit means having a tape of filter paper positioned between said inlet end and the end connected to the pumping means, means for moving said filter paper with particles lodged thereon from said filtering point to a burning position suitable for burning the particles, means for sealing the particles on the paper including a second tape of porous paper having a water-activatable adhesive layer on one side thereof, means for burning the particles at said burning position, means for coordinating the operation of said pumping means and said means for moving the filter paper to said burning position and said burning means whereby a first sample is collected and moved to the burning position for burning thereof while a second sample is being collected for subsequent burning, means for selecting and transducing into electricity a given spectrographic band of light from the burning sample and measuring the amount of the electricity as an indication of the amount of the selected band of particles contained in a given volume of air.

18. An apparatus as defined in claim 17 in which said filter paper is a continuous roll of tape which is moved at intervals into said filtering point and out of said point to the burning position.

19. An apparatus as defined in claim 18 in which a second tape of combustible material is applied to the filtering side of said filter paper tape between the filtering point and burning position whereby the sample may be burned without scattering of unburned particles.

20. A method of quantitatively determining the amount of an element present in a gaseous fluid in the form of fine particles comprising the steps of collecting a plurality of said particles to form a first sample, measuring the amount of fluid which carried said sample, moving said sample to a burning point, burning said sample, transducing the light from the burning of said sample into electricity, measuring the amount of said electricity as a measurement of the amount of said element present in said gaseous fluid, and repeating the steps of collecting, measuring, moving and transducing on a second sample as to which the collecting step is started before the measurement of the amount of electricity obtained from said first sample is completed.

21. An apparatus as defined in claim 17 in which the filter paper is a continuous roll of tape which is moved at intervals into said filtering point and out of said point to the burning position, said apparatus also comprising a second tape of combustible material that is applied to the filtering side of the filter tape between the filtering point and burning position, electrodes as part of said burning means which are discharged to burn the sample particles, and means for wetting said filter tape to help prevent the filtered particles caught thereon from scattering unburned when said electrodes are discharged.

22. An apparatus as defined in claim 17 in which the filter paper is a continuous roll of tape which is moved at intervals into said filtering point and out of said point to the burning position, in which the apparatus also comprises a second tape of combustible material that is applied to the filtering side of the filter tape between the filtering point and burning position in which the burning means includes copper electrodes with glass fiber sleeves, and in which the apparatus also comprises means for sealing the sample on said filter tape to prevent the filtered particles caught thereon from scattering unburned when said electrodes are discharged.

23. An apparatus as defined in claim 17 in which the filter paper is a continuous roll of tape which is moved at intervals into said filtering point and out of said part to the burning position, in which said apparatus also comprises a second tape of combustible material that is applied to the filtering side of the filter tape between the filtering point and burning position, in which the burning means includes electrodes comprising copper members with glass fiber sleeves as part of said burning means which are discharged to burn the sample particles, and in which the apparatus includes means for wetting said filter tape to help prevent the filtered particles caught thereon from scattering unburned when said electrodes are discharged.

24. An apparatus as defined in claim 17 in which the filter paper is a continuous roll of tape which is moved at intervals into said filtering point and out of said point to the burning position, in which said apparatus also comprises a second tape of combustible material that is applied to the filtering side of the filter tape between the filtering point and burning position, in which the burning means includes electrodes which are discharged to burn the sample particles, and in which said apparatus includes means for wetting said second tape enough that it prevents the scattering of unburned particles when the electrodes are discharged.

25. An apparatus as defined in claim 17 in which the filter paper is a continuous roll of tape which is moved at intervals into said filtering point and out of said point to the burning position, said apparatus also comprising a second tape of combustible material that is applied to the filtering side of the filter tape between the filtering point and burning position, electrodes as part of said burning means which are discharged to burn the sample particles, and means for sealing the sample on said filter tape including a supply of water containing a water soluble adhesive, means for moistening the second tape, and means for placing said second tape over said filter tape to prevent the filtered particles caught thereon from scattering unburned when said electrodes are discharged.

26. A portable self-contained unit for sampling a gaseous fluid for the presence of toxic particles therein and periodically measuring and continuously recording the amount of said toxic particles in a measured volume of said gaseous fluid comprising means for collecting a plurality of said particles for a predetermined plurality of said particles for a predetermined period to obtain a sample, means for measuring the volume of fluid used to obtain the sample, means for periodically burning said sample, means including an electronically operated and controlled spectrographic instrument for transducing the light from said burning sample into electricity to give a relatively continuous signal corresponding to the quantity of said toxic particles in the fluid and means for automatically repeating at a predetermined interval the first cycle of said measuring of the toxic particles and the volume, burning, and transducing on a second sample, the second cycle being started before the first cycle is completed to continue to produce the signal.

27. A method of quantitatively determining the quantity of a toxic material present in the form of particles borne in a gaseous fluid comprising the steps of periodically collecting a sample of gas-borne dust particles including toxic particles on a filter to form a sample, measuring the volume of said gaseous fluid required to collect said sample, sealing said sample on said filter by placing a second moistened filter over the first filter, periodically burning said sample, and transducing the light from the burning of said sample to a continuous electric signal corresponding to the quantity of said toxic particles in said gaseous fluid and means for repeating said five steps ing a recurring cycle.

28. A method of quantitatively determining the quantity of toxic material present in the form of particles borne in a gaseous fluid comprising the steps of periodically collecting a sample of gas-borne dust particles including toxic particles including beryllium oxide on a filter to form a sample, measuring the volume of said gaseous fluid required to collect said sample, sealing said sample on said filter to prevent the dust particles from scattering during subsequent processing, periodically burning said sample, and transducing the light from the burning of said sample to an electric signal corresponding to the quantity of said toxic particles in said measured volume of gaseous fluid, and repeating the above defined steps in a recurring cycle.

References Cited in the file of this patent

UNITED STATES PATENTS

| | | |
|---|---|---|
| 2,076,553 | Drinker et al. | Apr. 13, 1937 |
| 2,076,554 | Drinker et al. | Apr. 13, 1937 |
| 2,638,688 | Hazelton | May 19, 1953 |
| 2,883,901 | Danielsson | Apr. 28, 1959 |

UNITED STATES PATENT OFFICE
CERTIFICATE OF CORRECTION

Patent No. 3,088,364  May 7, 1963

John T. Rozsa et al.

It is hereby certified that error appears in the above numbered patent requiring correction and that the said Letters Patent should read as corrected below.

Column 13, line 67, after "means" insert -- for --; column 16, line 8, for "part" read -- point --; line 51, strike out "plurality of said particles for a predetermined".

Signed and sealed this 12th day of November 1963.

(SEAL)
Attest:

ERNEST W. SWIDER                                EDWIN L. REYNOLDS

Attesting Officer                            Acting Commissioner of Patents